(12) United States Patent
Kambayashi et al.

(10) Patent No.: US 7,578,000 B2
(45) Date of Patent: Aug. 18, 2009

(54) RENDERING DEVICE, RECORDING DEVICE, COPY CONTROL METHOD, AND PROGRAM

(75) Inventors: Toru Kambayashi, Chigasaki (JP); Tomoo Yamakage, Yokohama (JP); Hisashi Yamada, Yokohama (JP); Hirofumi Muratani, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 649 days.

(21) Appl. No.: 10/247,647

(22) Filed: Sep. 20, 2002

(65) Prior Publication Data

US 2003/0065621 A1 Apr. 3, 2003

(30) Foreign Application Priority Data

Sep. 29, 2001 (JP) ............................. 2001-375026

(51) Int. Cl.
*G06F 7/00* (2006.01)
(52) U.S. Cl. ............................. 726/31; 726/26; 380/201
(58) Field of Classification Search ................. 380/203, 380/201, 231; 726/31, 26; 713/193, 194; 369/47.12
See application file for complete search history.

(56) References Cited

U.S. PATENT DOCUMENTS

| | | | | |
|---|---|---|---|---|
| 6,374,036 B1 * | 4/2002 | Ryan et al. | ..................... | 386/94 |
| 6,526,510 B1 * | 2/2003 | Kori et al. | ..................... | 713/176 |
| 6,571,220 B1 | 5/2003 | Ogino et al. | | |
| 6,668,068 B2 * | 12/2003 | Hashimoto | ................... | 382/100 |
| 6,687,802 B1 * | 2/2004 | Kori et al. | ..................... | 711/163 |
| 6,813,436 B1 * | 11/2004 | Hirai | ............................ | 386/94 |
| 6,850,619 B1 * | 2/2005 | Hirai | ........................ | 380/203 |
| 2001/0017828 A1 * | 8/2001 | Yamada | ................... | 369/47.12 |
| 2003/0117920 A1 * | 6/2003 | Sako et al. | ............... | 369/53.21 |

FOREIGN PATENT DOCUMENTS

| | | |
|---|---|---|
| CN | 1189053 | 7/1998 |
| CN | 1292143 | 4/2001 |
| EP | 0 903 736 A2 | 3/1999 |
| EP | 0 969 462 A1 | 1/2000 |
| EP | 0 969 463 A1 | 1/2000 |
| EP | 1 001 624 A2 | 5/2000 |
| EP | 1 126 453 A2 | 8/2001 |
| JP | 10-79174 | 3/1998 |
| JP | 11-136622 | 5/1999 |
| JP | 11-353796 | 12/1999 |
| JP | 2000-57686 | 2/2000 |
| JP | 2000-175188 | 6/2000 |
| WO | WO 02/37493 A1 | 5/2002 |

OTHER PUBLICATIONS

U.S. Appl. No. 10/424,845, filed Apr. 29, 2003, Kambayashi et al.

* cited by examiner

*Primary Examiner*—Kimyen Vu
*Assistant Examiner*—Edward Zee
(74) *Attorney, Agent, or Firm*—Oblon, Spivak, McClelland, Maier & Neustadt, P.C.

(57) ABSTRACT

A rendering device to render a contents data comprises a reader, an information acquisition unit and a controller. The reader reads the contents data. The information acquisition unit acquires a copy control information. The controller controls rendering of the contents data while updating the acquired copy control information.

5 Claims, 12 Drawing Sheets

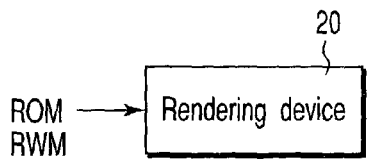
F I G. 1A
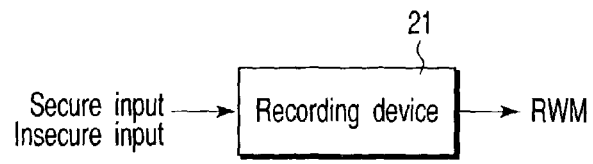
F I G. 1B
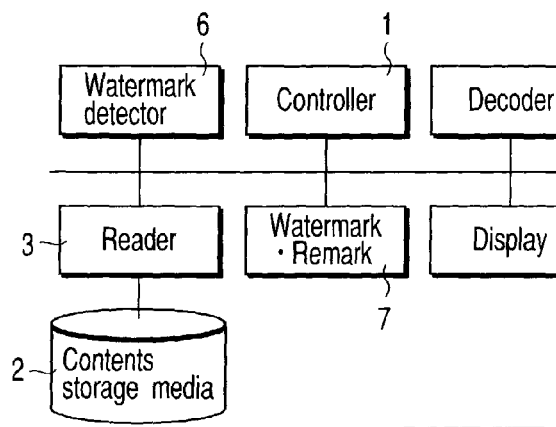
F I G. 2
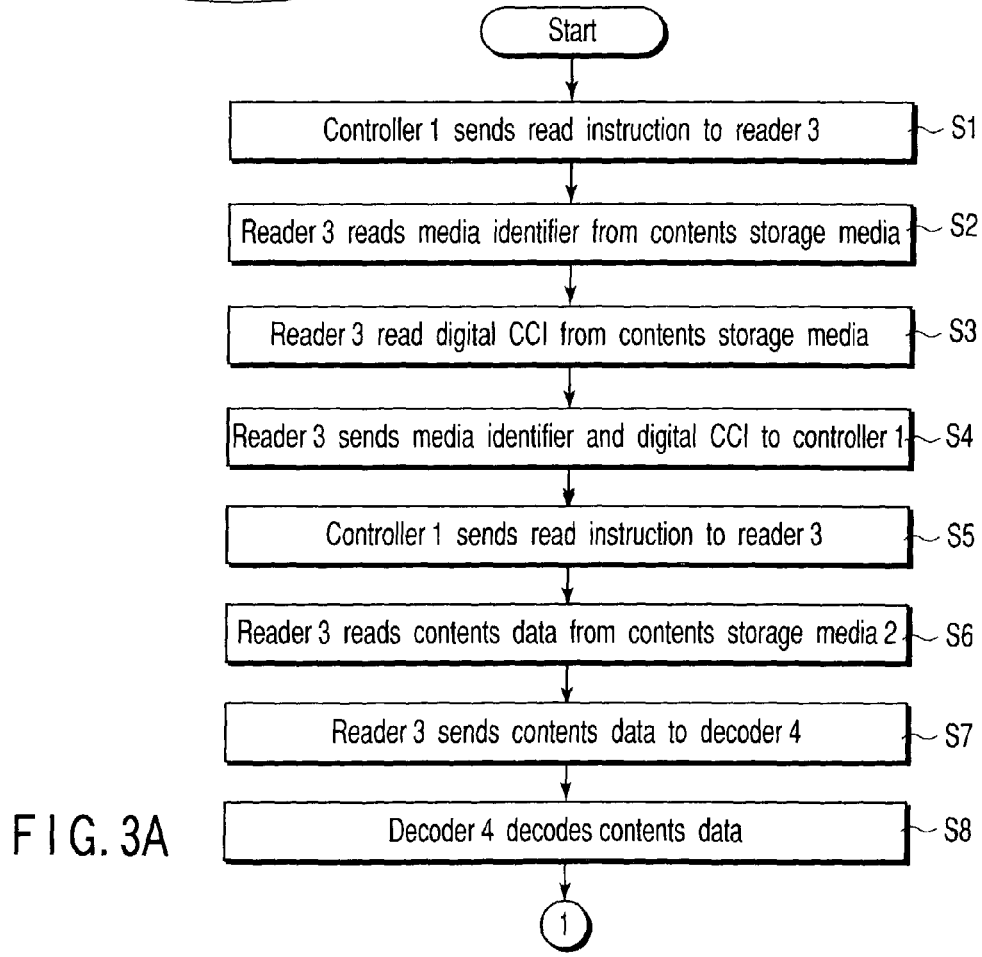
F I G. 3A

| Contents | | Operation | Rendering output |
|---|---|---|---|
| D-CCI | WM-CCI | | WM-CCI |
| None | None,CF | Rendering | NOP |
| | CO | | Remark |
| | CNM,CN | No rendering | N/A |
| CF | None,CF | Rendering | NOP |
| | CO,CNM,CN | No rendering | N/A |
| CO | Any | No rendering | N/A |
| CNM | CO | Rendering | Remark |
| | None,CF,CNM | | NOP |
| | CN | No rendering | N/A |
| CN | Any | | N/A |

FIG. 5

| Contents | | Operation | Rendering output |
|---|---|---|---|
| D-CCI | WM-CCI | | WM-CCI |
| CF | None,CF | Rendering | NOP |
| | CO,CNM,CN | No rendering | N/A |
| CO | CO | Rendering | Remark |
| | None,CF,CNM,CN | No rendering | N/A |
| CNM | CNM | Rendering | NOP |
| | None,CF,CO,CN | No rendering | N/A |
| CN | CN | Rendering | NOP |
| | None,CF,CO,CNM | No rendering | N/A |

| Contents | | Operation | Rendering output |
|---|---|---|---|
| D-CCI | WM-CCI | | WM-CCI |
| CF | None,CF | Rendering | NOP |
| | CO,CNM,CN | No rendering | N/A |
| CO | None | Rendering | NOP |
| | CO | Rendering | Remark |
| | CF,CNM,CN | No rendering | N/A |
| CNM | CNM,None | Rendering | NOP |
| | CF,CO,CN | No rendering | N/A |
| CN | CN,None | Rendering | NOP |
| | CF,CO,CNM | No rendering | N/A |

FIG. 8

| Input | Operation | Recorded contents |
|---|---|---|
| WM-CCI | | D-CCI |
| None,CF | Recording | CF |
| CO | | CNM |
| CNM | No recording | N/A |
| CN | | |

FIG. 9

| Input | Operation | Recorded contents |
|---|---|---|
| D-CCI | | D-CCI |
| CF | Recording | CF |
| CO | | CNM |
| CNM | No recording | N/A |
| CN | | |

| Contents | | Operation | Rendering output |
|---|---|---|---|
| D-CCI | WM-CCI | | WM-CCI |
| None | None,CF | Rendering | NOP |
| | CO | | Remark |
| | CNM,CN | No rendering | N/A |
| CF | None,CF | Rendering | NOP |
| | CO,CNM,CN | No rendering | N/A |
| CO | Any | No rendering | N/A |
| CNM | CO | Rendering | Remark |
| | None,CF,CNM | | NOP |
| | CN | No rendering | N/A |
| CN | Any | No rendering | N/A |

RENDERING DEVICE, RECORDING DEVICE, COPY CONTROL METHOD, AND PROGRAM

CROSS REFERENCE TO RELATED APPLICATIONS

The application is based upon and claims the benefit of priority from the prior Japanese Patent Application No. 2001-375026, filed Sep. 29, 2001, the entire contents of which are incorporated herein by reference.

BACKGROUND OF THE INVENTION

1. Field of the Invention

The present invention relates to a rendering device to render contents, a recording device to record contents, and a copy control method.

2. Description of the Background Art

The copy control of the literary work is performed based on a CCI (copy control information). In the CCI, there are two types of a digital CCI (D-CCI) and a watermark CCI (WM-CCI). The digital CCI is the digital information which is associated with the literary work which is the digital data. Moreover, the watermark CCI is the digital information embedded in the literary work by using a watermark technology. The watermark CCI can be detected from among the literary works expressed as the analog signal.

For instance, the image contents are expressed as the digital data of the MPEG2 format, and are recorded on the contents storage media. The digital CCI can be associated with the corresponding digital data. The digital CCI cannot be detected in the rendered image contents, while the watermark CCI embedded in the image contents can be detected from the rendered image contents.

In the CCI, there are at least four following kinds of CCIs (CF, CO, CNM, CN). In general, a "CF" shows that contents can be freely copied. A "CO" shows that contents are permitted to perform the copy only once. When the contents whose CCI is "CO" are copied, the CCI of the contents made by the copy is set to a "CNM". The "CNM" and "CN" show that the copy of the corresponding contents data is not permitted. The "CNM" is set to the contents made by the copy of the contents whose CCI is the "CO" as mentioned above. On the other hand, the "CN" is different from the "CNM" at a point that the "CN" is set to the contents from which the copy is prohibited.

It is especially called a "Remark" to change the watermark CCI from the "CO" to the "CNM" when the contents are copied.

The recording device decides right or wrong of the copy of the contents based on the CCI, and performs the recording operation. This is called a copy control based on the CCI.

The literary work might be recorded on the media. The media which stores the literary work might have information which is called a media identifier. The media identifier has at least two kinds of media identifiers of an ROM and an RWM. The ROM shows that the corresponding media is a read only media and is not writable. The RWM shows that the corresponding media is readable and writable.

In the copy control by the conventional watermark CCI, it is necessary to check the watermark and perform the remark when recording according to circumstances. It is similar to the contents data input from the secure input.

The secure input of the recording device is connected with the secure output of other devices. The mutual authentication of the device is performed usually. In addition, the communication between corresponding devices is usually protected by encoding, and the falsification of the communication data is difficult. The digital CCI accompanies the contents data input from the secure input. It is preferable to perform the copy control based on only the digital CCI.

However, the detection and the remark of the watermark CCI are performed to the contents data input from the secure input in the conventional copy control. This is necessary treatment to keep the consistency to the recording of the insecure input in a state that the contents are recorded on the contents storage media.

The input data from the secure input is encoded usually. It is necessary to decode the contents data to detect and remark the watermark CCI. The recording of the secure input is basically a copy operation of the digital data, and a high-speed recording can be performed originally. The detection and the remark of the watermark CCI are the troubles of the high-speed recording.

BRIEF SUMMARY OF THE INVENTION

An object of the present invention is to provide a rendering device, a recording device, and a copy control method which enable a high-speed recording of contents data.

A rendering device according to a first aspect of the present invention is characterized by comprising: a reader configured to read the contents data from a media; an information acquisition unit configured to acquire a copy control information; and a controller configured to control rendering of the contents data while updating the acquired copy control information.

A rendering device to render a contents data according to a second aspect of the present invention is characterized by comprising: a reader configured to read the contents data and a first copy control information corresponding to the contents data; a detection unit configured to detect a second copy control information embedded in the contents data as a digital watermark from the contents data; and a controller configured to control whether the contents data is rendered or not based on the first copy control information and the second copy control information.

A recording device to record a contents data according to a third aspect of the present invention is characterized by comprising: a secure input unit configured to input the contents data and a first copy control information corresponding to the contents data; an insecure input unit configured to input the contents data; a detector configured to detect a second copy control information embedded in the contents data as a digital watermark only for the contents data input from the insecure input unit; and a controller configured to control whether the contents data input from the secure input unit and the contents data input from the insecure input unit is recorded or not based on the first copy control information and the second copy control information, respectively.

A copy control method in the rendering device which renders a contents data, according to a fourth aspect of the present invention is characterized by comprising: reading the contents data and a first copy control information corresponding to the contents data; detecting a second copy control information embedded in the contents data as a digital watermark from the contents data; and controlling whether to render the contents data or not based on the first copy control information and the second copy control information.

A copy control method in the recording device to record a contents data, according to a fifth aspect of the present invention is characterized by comprising: inputting the contents data and a first copy control information corresponding to the contents data from a secure input; and controlling whether the input contents data is recorded or not based on the first copy control information input from the secure input regardless of a content of the second copy control information embedded in the contents data as a digital watermark.

A computer readable recording medium according to a sixth aspect of the present invention is characterized by comprising: a contents data to which a copy control information is embedded as a digital watermark; and a copy control information which shows different meaning from meaning shown by the copy control information.

A program to function a computer as a rendering device to render a contents data, according to a seventh aspect of the present invention is characterized by comprising: a read function to read the contents data and a first copy control information corresponding to the contents data; a detection function to detect a second copy control information embedded in the contents data as a digital watermark from the contents data; and a control function to control whether the contents data is rendered or not based on the first copy control information and the second copy control information.

A program to function a computer as a recording device to record a contents data, according to an eighth aspect of the present invention is characterized by comprising: a secure input function to input the contents data and a first copy control information corresponding to the contents data; an insecure input function to input the contents data; a detection function to detect a second copy control information embedded in the contents data as a digital watermark only for the contents data input from the insecure input function; and a control function to control whether the contents data is recorded or not based on each of the first copy control information as for the contents data input from the secure input function and the second copy control information as for the contents data input from the insecure input function.

The present invention according to the device is approved as an invention according to a method, and the present invention according to the method is approved as an invention according to a device.

The present invention according to the device or the method is approved as a program to make the computer execute the procedure which corresponds to the corresponding invention (or, to make the computer function as means which corresponds to the corresponding invention, or to achieve a function which corresponds to the corresponding invention in computer), and approves as a computer readable record medium which records the program.

The rendering device according to the present invention performs the detection and the remark of the second copy control information embedded in the contents data as the watermark. As a result, it becomes possible to secure the consistency of the CCI in the state of the rendering output signal. The recording device according to the present invention skips the detection of the second copy control information which is embedded in the contents data as the watermark to the secure input (the remark is not performed to the insecure input, too). As a result, it becomes possible to perform a safe copy control without ruining the consistency of the system about the recording of the secure input and the recording of the insecure input, and it becomes possible to perform the recording of a high-speed secure input.

BRIEF DESCRIPTION OF THE SEVERAL VIEWS OF THE DRAWING

FIG. 1A and FIG. 1B are figures to explain outlines of the rendering device and the recording device;

FIG. 2 is a figure which shows a configuration of the rendering device according to the embodiment of the present invention;

FIG. 3A to FIG. 3C are flowcharts which show an example of an operation of the rendering device according to the embodiment of the present invention;

FIG. 5 is a figure which shows an example of the method of deciding whether rendering is performed and whether the remark is present or not based on the digital CCI and the watermark CCI when the media identifier is the RWM;

FIG. 6 is a figure which shows an example of the method of deciding whether rendering is performed and whether the remark is present or not based on the digital CCI and the watermark CCI when the media identifier is the ROM;

FIG. 7 is a figure which shows another example of the method of deciding whether rendering is performed and whether the remark is present or not based on the digital CCI and the watermark CCI when the media identifier is the ROM;

FIG. 8 is a figure to explain an operation of the recording device in the insecure input according to the embodiment of the present invention;

FIG. 9 is a figure to explain an operation of the recording device in the secure input according to the embodiment of the present invention;

DETAILED DESCRIPTION OF THE INVENTION

Figure 3B:
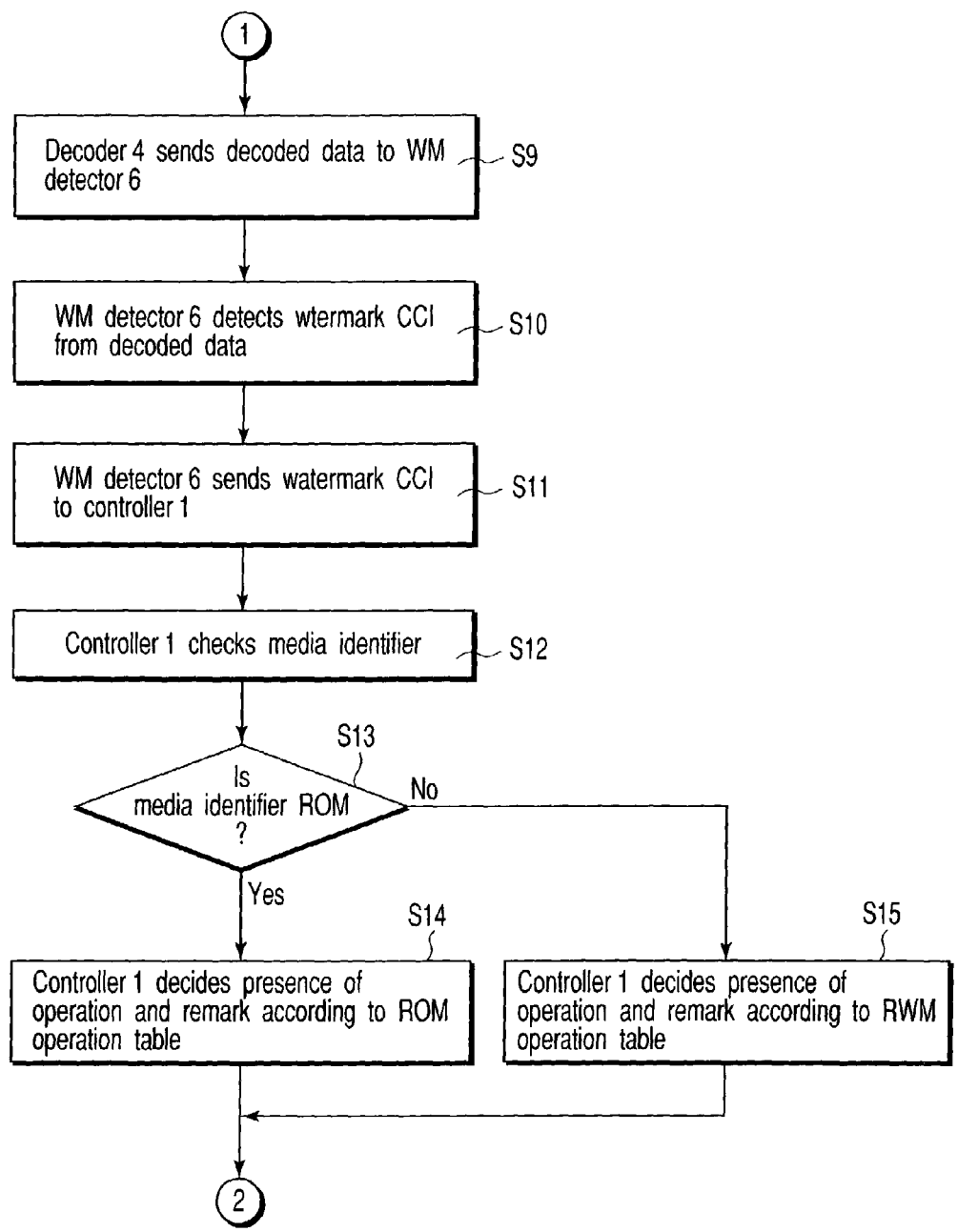

Hereinafter, the embodiment of the present invention will be explained referring to the drawings.

In the embodiment, the contents data is assumed to be the digitalized literary work.

In the embodiment, it is assumed that the rendering device is a device which renders the contents data (display of the image and the voice etc.) stored in the media such as the ROM (Read Only media) (media for read only) or RWM (Read Write media) (media which can be written) (see FIG. 1A). The ROM which stores the contents is assumed to be manufactured by the maker of the contents disks etc. (and supplied to the end user). It is assumed that the RWM which stores the contents is manufactured by the end user.

In the embodiment, the recording device is a device which records (copies) the contents data input from the secure input or the insecure input on the media such as the RWM (see FIG. 1B).

The rendering device and the recording device are assumed to be used by the end user.

In the following explanation, the rendering device according to the embodiment will be first explained. Next, the recording device according to the embodiment will be explained.

The configuration of the rendering device according to the embodiment of the present invention is shown in FIG. 2.

The rendering device according to the embodiment has a controller 1, a contents storage media 2, a reader 3, a decoder 4, a display 5, a watermark detector 6 (WM detector), and watermark remarker 7 (WM remark detector) as shown in FIG. 2.

The contents storage media 2 stores the contents data as the processing target. The contents storage media 2 may be a removable media.

There are the contents storage media 2 which has the media identifier and the contents storage media 2 which does not have the media identifier.

Here, the ROM and the RWM are assumed as the media and a case that the contents storage media 2 assumed to have the media identifier of "ROM" or the media identifier of "RWM" will be explained.

There are various methods such as a method of treating considering the media to have the media identifier of "RWM" for the media which has no identifier and a method of not rendering the media, etc. for instance.

The digital CCI might be associated with the contents data. When the digital CCI is associated with the contents data, the digital CCI is stored on the contents storage media 2 with the corresponding contents data.

Here, a case that the contents data and the digital CCI which is associated with the contents is stored about the ROM is assumed and will be explained.

In the contents data stored in the contents storage media 2, there is a case where the watermark CCI is embedded and a case where the watermark CCI is not embedded.

As described later in detail, the rendering device decides whether rendering is performed or not and the watermark CCI is remarked or not when rendering, based on (the contents of or without) the media identifier of the contents storage media 2, (the contents of or without) the digital which is associated with the contents data, and (the contents of or without) the watermark CCI embedded into the contents data.

Here, it will be explained by assuming a case that the contents data is compressed by the data compression processing and stored on the contents storage media 2 (To support the rendering of the contents data which is not compressed, the decode process may be omitted).

The reader 3 reads the contents data from the contents storage media 2. When the contents storage media 2 has the media identifier, the reader 3 reads the media identifier of the contents storage media 2. When the digital CCI associated with the contents data stored in the contents storage media 2 exists and the digital CCI and the corresponding contents data are stored in the contents storage media 2, the reader 3 reads the digital CCI.

The decoder 4 performs processing for development to display the contents data which is compressed by the data compression processing on the display 5.

The WM detector 6 detects the watermark from the contents data. The WM detector 6 has a form which detects the watermark before decoding and a form which detects the watermark after decoding about the decoded contents data.

WM remarker 7 remarks the watermark CCI of the contents if necessary. The WM remarker 7 has a form which remarks the watermark CCI before decoding and a form which remarks the watermark CCI after decoding about the decoded contents data.

The display 5 displays the contents data (for instance, image and/or voice).

The controller 1 controls the operation of the rendering device.

Figure 3C:
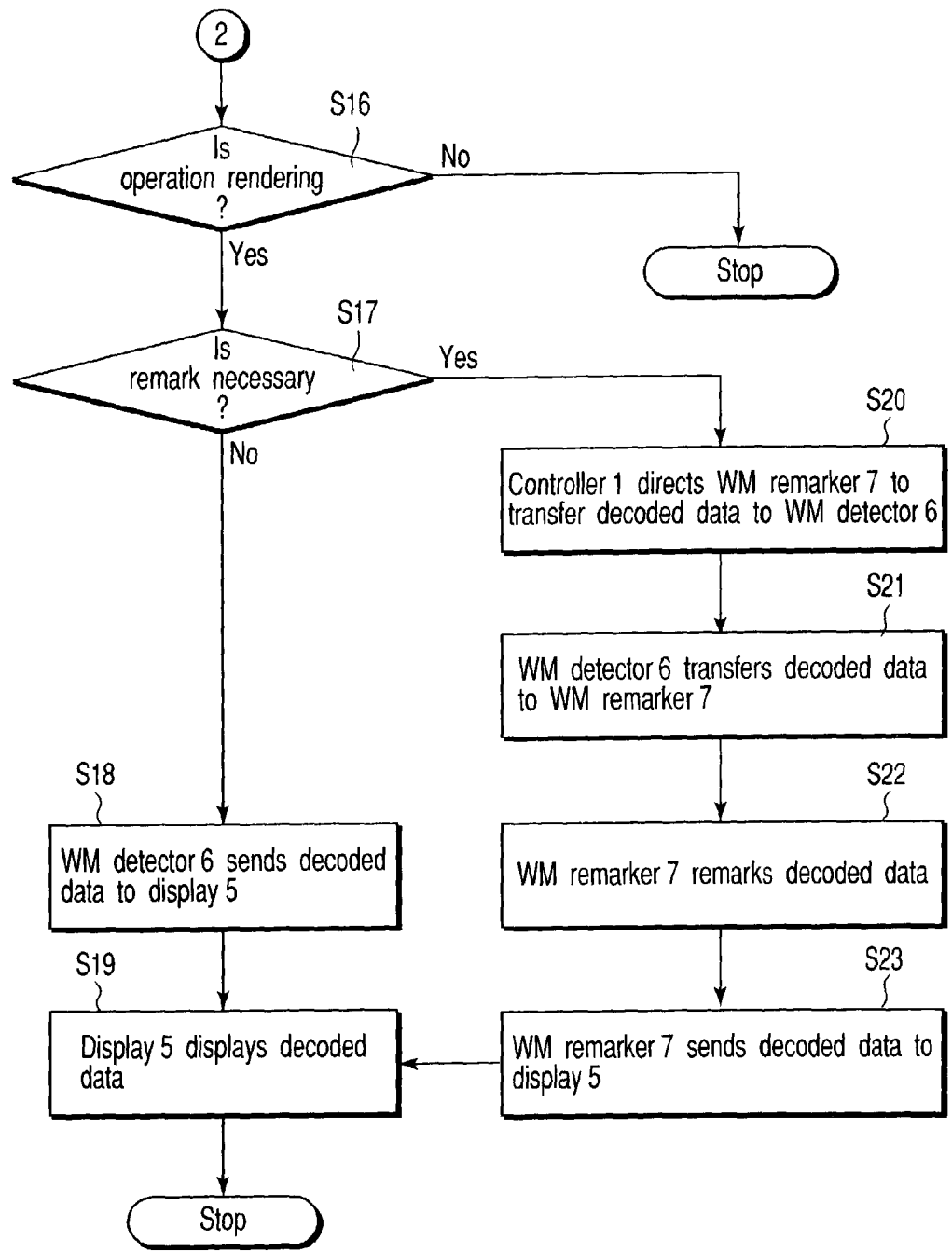

FIG. 3A to FIG. 3C are figures which show an example of an operation of the rendering device according to the embodiment.

The operation example of the rendering device is an example when the WM detector 6 detects the watermark CCI after decoding (The remark is also performed after decoding).

The controller 1 sends the read instruction to the reader 3 (step S1).

The reader 3 which has received the read instruction reads the media identifier and the digital CCI from the contents storage media 2 (step S2 and step S3). And, the reader 3 sends the read media identifier and digital CCI to the controller 1 (step S4). For instance, when the digital CCI associated with the contents does not exist, the reader 3 sends a specific numerical value (0, for instance) to the controller 1 as the digital CCI. The numerical value indicates that the digital CCI does not exist (None). In this case, there is a method of sending the digital CCI and the bit information, which shows whether the digital CCI exists. When the digital CCI does not exist in the method, the notified digital CCI value becomes "don't care". Similar to the media identifier, when the media identifier does not exist, the reader 3 sends a specific numerical value which shows that the media identifier does not exist to the controller 1, for instance, as the media identifier.

Next, the controller 1 sends the contents read instruction to the reader 3 (step S5).

The reader 3 which has received the contents read instruction reads the contents data from the contents storage media 2 (step S6). Thereafter, the reader 3 sends the read contents data to the decoder 4 (step S7).

The decoder 4 decodes the received contents data (step S8). And, the decoder 4 sends the decoded result (decoded data) to the watermark detector 6 (step S9).

The watermark detector 6 detects the watermark CCI from the received decoded data (step S10). And, the watermark detector 6 sends the watermark CCI to the controller 1 (step S11). When the watermark CCI does not exist, the watermark detector 6 sends a specific numerical value (0, for instance) to the controller 1, for instance, as the watermark CCI. The numerical value shows that the watermark CCI does not exist (None). In this case, there is also a method of sending the watermark CCI and the bit information which shows whether the watermark CCI exists or not. When the watermark CCI does not exist in the method, the value of the notified watermark CCI becomes "don't care".

Next, the controller 1 checks the media identifier (step S12).

Then, if the media identifier indicates the ROM (yes in step S13), the controller 1 decides an "Operation" and a "Presence of the remark" based on the digital CCI (D-CCI), the watermark CCI (WM-CCI), and the ROM operation table (judgment reference) (see FIG. 6 etc. described later) as described later in detail (step S14).

On the other hand, if the media identifier indicates the RWM (Here, if the media identifier does not exist, it is assumed that the media identifier is the RWM) (No in step S13), the controller 1 decides an "Operation" and a "Presence of the remark" based on the digital CCI (D-CCI), the watermark CCI (WM-CCI), and the RWM operation table (judgment reference) (see FIG. 5 etc. described later) as described later in detail (step S15). There is also a method of ending the processing without rendering the contents data when the media identifier does not exist.

The processing is ended without rendering the contents data, if the "Operation" is decided to "Do not render" in step S14 or step S15 (No in step S16).

If the "Operation" is decided to "Render" in step S14 or step S15 and the "Remark" is decided to "Do not remark" (Yes in step S16 and No in step S17), the watermark detector 6 sends the decoded data to the display 5 (step S18) and the display 5 displays the decoded data (step S19).

First of all, if the "Operation" is decided to "Render" in step S14 or step S15 and the "Remark" is decided to "Remark" (Yes in step S16 and Yes in step S17), the following processing is performed. That is, the controller 1 directs the watermark detector 6 to transfer the decoded data to the watermark remarker 7 (step S20). The watermark detector 6 which has received the instruction transfers the decoded data to the watermark remarker 7 (step S21). The watermark remarker 7 remarks the watermark CCI of the received decoded data (step S22). And, the decoded data which is remarked by the watermark remarker 7 is sent to the display 5 (step S23). The display 5 displays the decoded data (step S19).

Figure 4A:
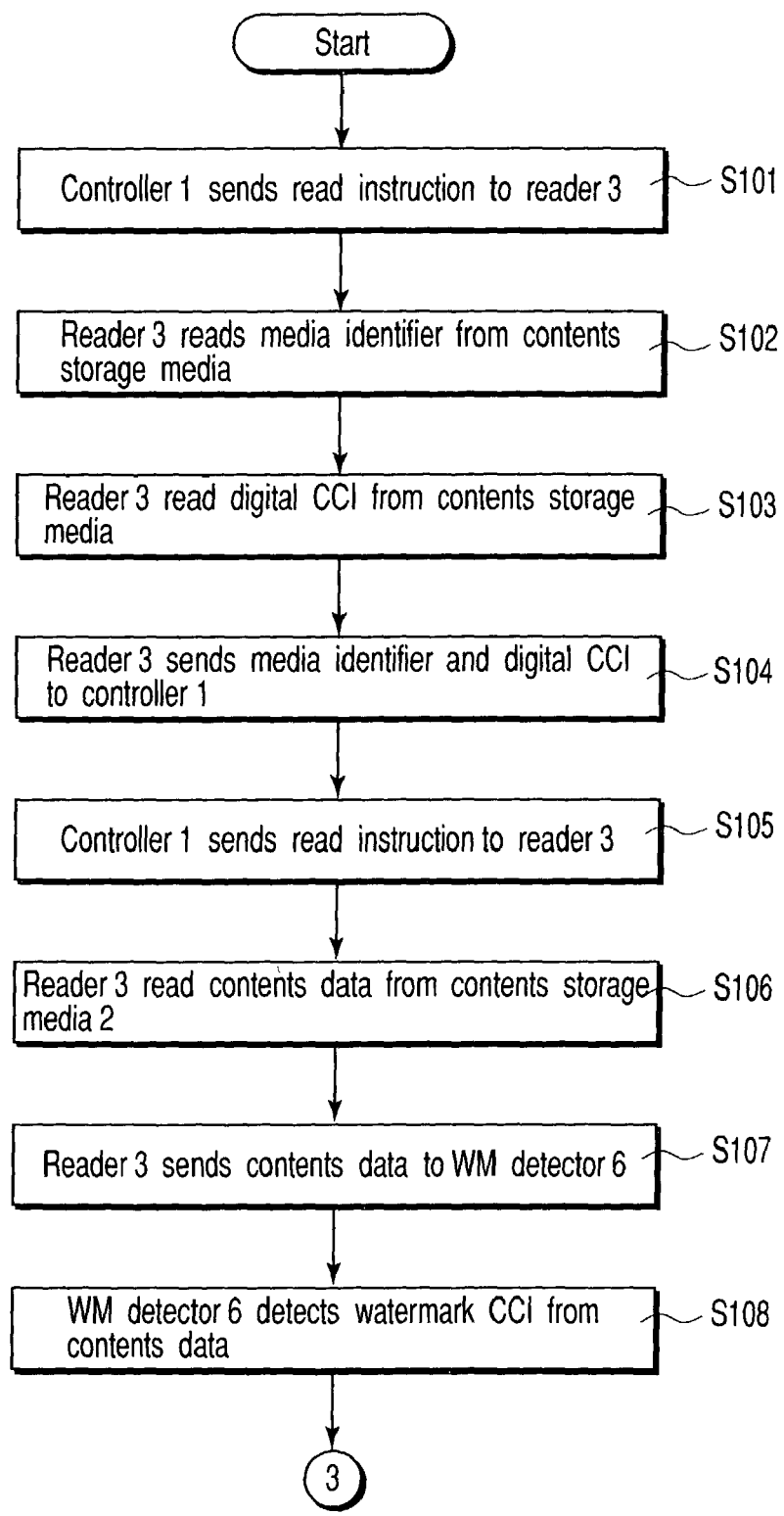
FIG. 4A to FIG. 4C are flowcharts which show another example of an operation of the rendering device according to the embodiment of the present invention.
Figure 4B:
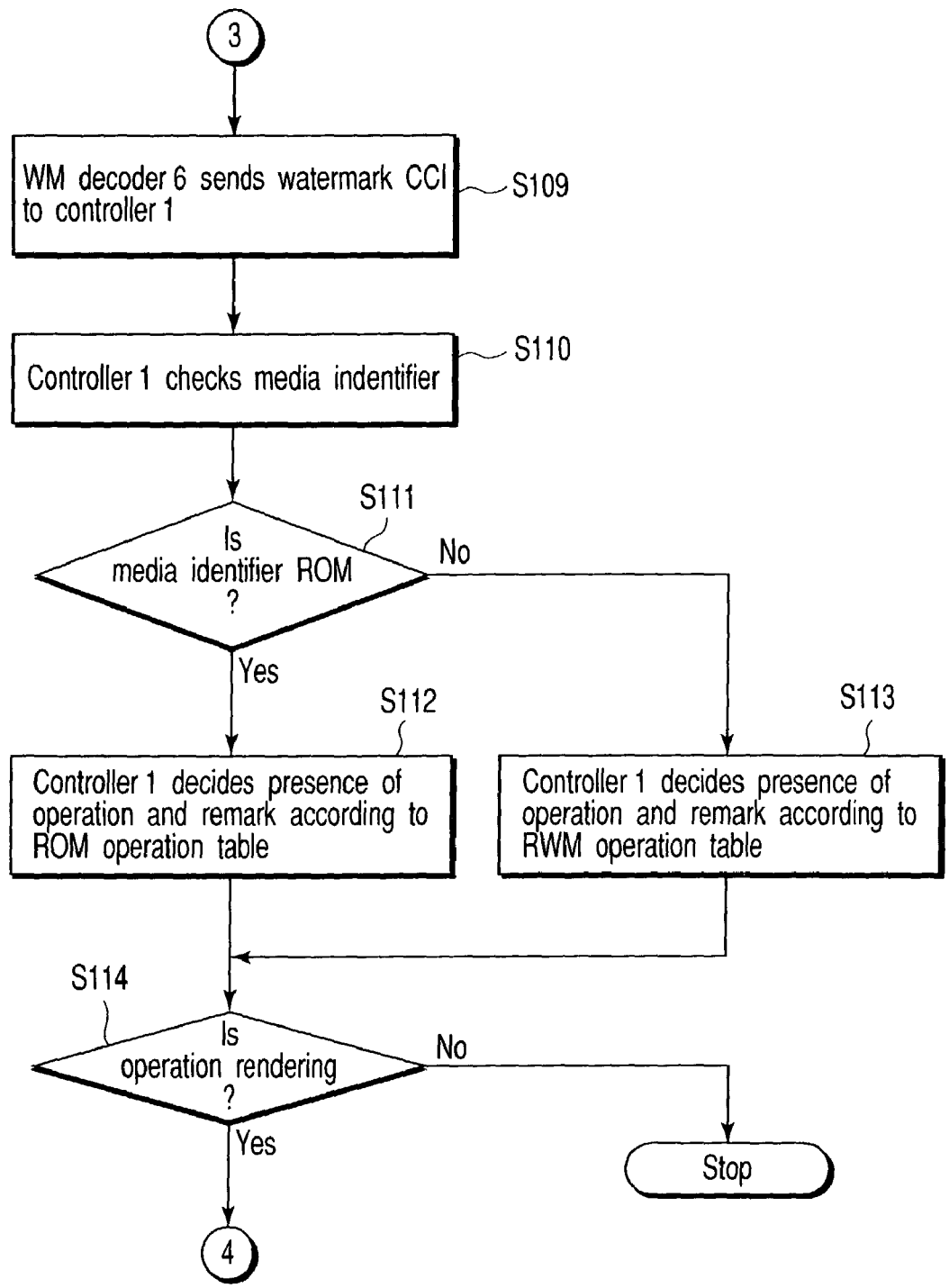
Figure 4C:
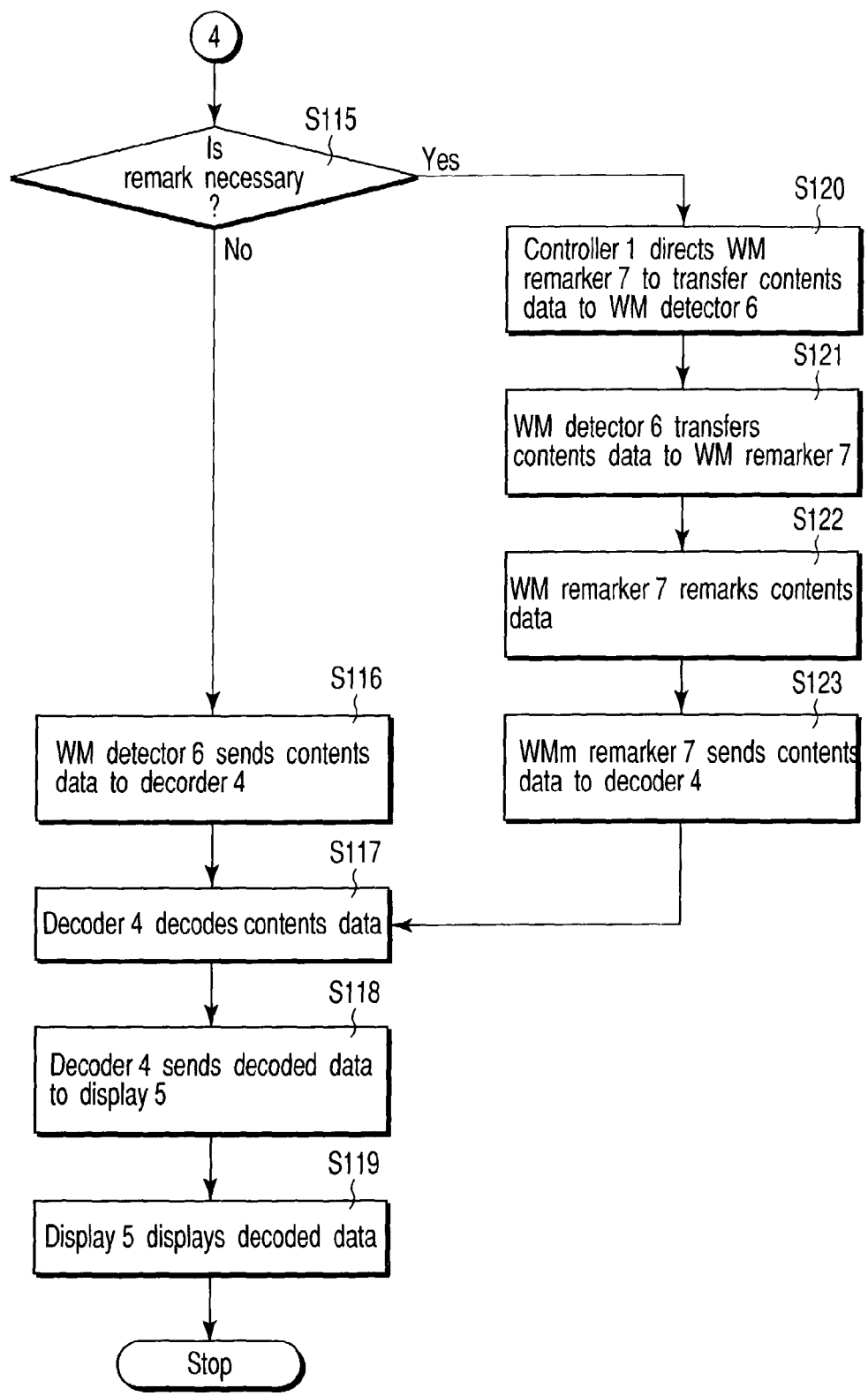

FIG. 4A to FIG. 4C show the other example of the operation of the rendering device according to the embodiment.

The operation example of the rendering device is an example when the WM detection part 6 detects the watermark CCI before decoding (in the example, the remark is assumed to be performed before decoding, too).

The controller 1 sends the read instruction to the reader 3 (step S101).

The reader 3 which has received the read instruction reads the media identifier and the digital CCI from the contents storage media 2 (step S102 and step S103). The reader 3 sends the read media identifier (Or, a value which shows that the media identifier does not exist) and the read digital CCI (Or, a value which shows that the digital CCI does not exist) to the controller 1 (step S104).

Next, the controller 1 sends the contents read instruction to the reader 3 (step S105).

The reader 3 which has received the contents read instruction reads the contents data from the contents storage media 2 (step S106). Thereafter, the reader 3 sends the read contents data to the watermark detector 6 (step S107).

The watermark detector 6 detects the watermark CCI from the received contents data (step S108). And, the watermark detector 6 sends the detected watermark CCI (Or, a value which shows that the digital CCI does not exist) to the controller 1 (step S109).

Next, the controller 1 checks the media identifier (step S110).

And, if the media identifier indicates the ROM (Yes in step S111), the controller 1 decides the "Operation" and the "Presence of the remark" based on the digital CCI (D-CCI), the watermark CCI (WM-CCI), and the ROM operation table (judgment reference) (see FIG. 6 etc. described later) as described later in detail (step S112).

On the other hand, if the media identifier indicates the RWM (Here, if the media identifier is not the ROM, the media identifier is assumed to be the RWM) (No in step S111), the controller 1 decides the "Operation" and the "Presence of the remark" based on the digital CCI (D-CCI), the watermark CCI (WM-CCI), and the RWM operation table (judgment reference) (see FIG. 5 etc. described later) as described later in detail (step S113). If the media identifier does not exist as well as the above-mentioned case, there is also a method of ending the processing without rendering the contents data.

The processing is ended without rendering the contents data, if the "Operation" is decided to "Do not render" in step S112 or step S113 (No in step S114).

If the "Operation" is decided to "Render" in step S112 or step S113 and the "Remark" is decided to "Do not remark" (Yes in step S114 and No in step S115), the following each operation will be executed. The watermark detector 6 sends the contents data to the decoder 4 (step S116). The decoder 4 decodes the received contents data (step S117). The decoder 4 sends the decoded result (decoded data) to the display 5 (step S118). The display 5 displays the decoded data (step S119).

First of all, the following processing is performed, if the "Operation" is decided to "Render" in step S112 or step S113 and the "Remark" is decided to "Remark" (Yes in step S114 and Yes in step S115). That is, the controller 1 directs the watermark detector 6 to transfer the contents data to the watermark remarker 7 (step S120), and the watermark detector 6 which has received the instruction transfers the decoded data to the watermark remarker 7 (step S121). The watermark remarker 7 remarks the watermark CCI of the received decoded data (step S122). Then, the contents data which is remarked by the watermark remarker 7 is sent to the decoder 4 (step S123). The decoder 4 decodes the received contents data (step S117). The decoder 4 sends the decoded result (decoded data) to the display 5 (step S118). The display 5 displays the decoded data (step S119).

The procedure of FIG. 3A to FIG. 3C and FIG. 4A to FIG. 4C are one example, and may be executed by being properly modified. For instance, an order of the read of the media identifier, the digital CCI and the contents, the detection of the watermark CCI from the contents, and the transfer thereof may be properly changed.

Hereinafter, a procedure which decides the "Operation" and the "Presence of the remark" will be explained based on the digital CCI, the watermark CCI, and the ROM operation table or the RWM operation table in detail.

In FIG. 5 to FIG. 7, a D-CCI shows the digital CCI which is stored in the contents storage media associated with the contents, the D-CCI being "None" shows that the corresponding contents do not have the digital CCI. Usually, the digital CCI is associated with the contents which is stored in the contents storage media which have the copyright protection function. Therefore, the contents not to be accompanied by the digital CCI is the contents stored in the contents storage media without the copyright protection function.

The WM-CCI shows the watermark CCI. The WM-CCI being "None" shows that the watermark CCI is not embedded in the corresponding contents.

The "Remark" shows that the watermark CCI is remarked, and "NOP" shows that the watermark CCI is not remarked.

A case that the media identifier is the ROM will be explained.

FIG. 6 shows an example of the operation table in this case.

In this case, the contents storage media is the read only media. The package media for contents sales etc. correspond to the contents storage media. As for the package media, a large amount of the media with the same content are produced by the method of the print etc. at the factory. Only a media which has a copyright protection function is considered as the read only contents storage media in an example of FIG. 6. Therefore, it is supposed that the contents data on the contents storage media requires the digital CCI in the example of FIG. 6.

When the watermark CCI is embedded in the contents which is stored on the read only media, it is considered that the corresponding watermark CCI corresponds to the digital CCI in the example of FIG. 6. It is considered that there can be a case that the watermark CCI is not embedded when the digital CCI is "CF", exceptionally.

Then, it is decided that the rendering device renders the corresponding contents, only in a case that the watermark CCI and the digital CCI are agreed, and in a case that the digital CCI is a "CF" and the watermark CCI are "None", in the example of FIG. 6. In other words, it is decided that the rendering device does not render the corresponding contents when the watermark CCI and the digital CCI are not agreed excluding the above-mentioned exception. The reason is to be considered that the contents in which the watermark CCI and the digital CCI are not agreed should not exist excluding the above-mentioned exception, and, therefore, such contents should be illegal contents.

The rendering device renders the corresponding contents in a case of the above-mentioned exception or when the watermark CCI and the digital CCI are agreed. In this case, it is decided that the watermark CCI is remarked only when the watermark CCI is "CO" (Therefore, the digital CCI is "CO", too). That is, when the watermark CCI is "CO", the rendering device changes the watermark CCI of the corresponding contents to "CNM" and the corresponding contents will be rendered. On the other hand, in a case of rendering the contents and a case that the watermark CCI is other than a case of "CO", it is decided that the watermark CCI is not remarked. That is, the rendering device does not add any changes to the watermark CCI (NOP) and renders the contents.

When the rendering is not performed, the watermark CCI with the rendering output does not exist (N/A), naturally.

FIG. 7 shows another example of the operation table when the media identifier is the ROM.

Basically, though the operation table of FIG. 7 is the same as that of FIG. 6; it is decided that the corresponding contents are rendered when the digital CCI is "CO", "CNM" or "CN", and the watermark CCI is "None" in FIG. 7. The maker becomes possible to take the selection that the watermark is not embedded in the contents data whose digital CCI is "CO", "CNM" or "CN".

In addition to the above-mentioned methods, the following methods become possible.

(1) A method of deciding to render the corresponding contents when the digital CCI is "CF" and the watermark CCI is "None", and deciding not to render the corresponding contents when the digital CCI is "CO", "CNM" or "CN" and the watermark CCI is "None";

(2) A method of deciding to render the corresponding contents when the digital CCI is "CO" and the watermark CCI is "None", and deciding not to render the corresponding contents when the digital CCI is "CF", "CNM" or "CN" and the watermark CCI is "None";

(3) A method of deciding to render the corresponding contents when the digital CCI is "CNM" and the watermark CCI is "None", and deciding not to render the corresponding contents when the digital CCI is "CF", "CO" or "CN" and the watermark CCI is "None";

(4) A method of deciding to render the corresponding contents when the digital CCI is "CF" or "CO" and the watermark CCI is "None", and deciding not to render the corresponding contents when the digital CCI is "CNM" or "CN" and the watermark CCI is "None";

(5) A method of deciding to render the corresponding contents when the digital CCI is "CF" or "CNM" and the watermark CCI is "None", and deciding not to render the corresponding contents when the digital CCI is "CO" or "CN" and the watermark CCI is "None"; and (6) A method of deciding to render the corresponding contents when the digital CCI is "CO" or "CNM" and the watermark CCI is "None", and deciding not to render the corresponding contents when the digital CCI is "CF" or "CN" and the watermark CCI is "None".

In any cases, it is decided that the remark is performed in a case of deciding to render the corresponding contents when the watermark CCI is "CO".

Next, a case that the media identifier is RWM will be explained.

Here, an operation of the recording device as one supposition will be explained first (The recording device is described later in detail).

The secure input is an input by way of the digital copyright protection mechanisms such as encoding and the equipment authentication, as mentioned above. The contents data input from the secure input is always accompanied by the digital CCI. On the other hand, the contents data input from the insecure input is not accompanied by the digital CCI.

FIG. 8 is a figure which shows an example of the description of the operation of the insecure input in the recording device.

The recording device checks the "Watermark CCI" about the contents input from the insecure input.

The recording device records the corresponding contents as a digital data when the detected watermark CCI is "CF" or "CO" or when the detected watermark CCI is "None" (When there is no the watermark CCI). The recording device records the corresponding contents to which the digital CCI of "CF" is added to when the watermark CCI is "CF" or "None" and records the corresponding contents to which the digital CCI of "CNM" is added when the watermark CCI is "CO". Thus, it is one point that the recording device does not remark the watermark CCI for the insecure input as mentioned above.

On the other hand, when the detected watermark CCI is "CNM" or "CN", the recording device does not record the corresponding contents.

As a result, the digital CCI of one of "CF" or "CNM" will be associated with the contents data which is input from the insecure input and is stored on the media such as the RWM in the operation of FIG. 8.

FIG. 9 shows an example of the description of the operation of the secure input in the recording device.

The recording device checks the "digital CCI" about the contents input from the secure input.

When the detected digital CCI is "CF" or "CO", the recording device records the corresponding contents as a digital data. The recording device records the corresponding contents to which the digital CCI of "CF" is added when the digital CCI is "CF", and records the corresponding contents to which the digital CCI of "CNM" is added when the digital CCI is "CO".

On the other hand, when the detected digital CCI is "CNM" or "CN", the recording device does not record the corresponding contents.

As a result, the digital CCI associated with the contents data which is input from the secure input and is stored on the media such as the RWM becomes either one of "CF" or "CNM" in the operation of FIG. 9.

Thus, it is a point that the recording device does not treat the watermark CCI for the secure input in the embodiment as mentioned above.

A case that the media identifier is RWM will be explained.

FIG. 5 shows an example of the operation table in this case.

In this case, the contents storage media is the media which can be written. First of all, the media to which the contents data is written with the recording device as mentioned above for instance is supposed as the writable media. However, other contents storage media (for instance, a media on which the digital CCI of the contents does not exist) are also supposed as the writable media.

It is considered that the corresponding contents are recorded on the media which do not have the copyright protection function in a case that the digital CCI of the contents is "None" (a case of not existing).

In this case, it is decided that the corresponding contents are not rendered if the watermark CCI is "CNM" or "CN". The reason is why such the contents should not be recorded on the media which has no copyright protection function.

It is decided that the corresponding contents are rendered the watermark CCI is remarked if the watermark CCI is "CO". That is, the watermark CCI is rewritten to "CNM" and the media is rendered.

If the watermark CCI is "None" (does not exist) or "CF", it is decided that the corresponding contents is rendered and the watermark is not remarked. That is, the media is rendered without remarking the watermark CCI.

In a case that the digital CCI of the contents is "CF", If the watermark CCI is "None" (does not exist) or "CF", it is decided that the corresponding contents is rendered and the watermark is not remarked. It is decided that the corresponding contents are not rendered if the watermark CCI is "CO", "CNM" or "CN". The contents having such the watermark CCI cannot have the digital CCI of "CF".

It is decided that the corresponding contents is rendered regardless of the content of the watermark CCI (Any) when the digital CCI of the contents is "CO". The reason is why the contents having the CCI digital of "CO" should not be recorded on the writable media.

It is decided that the corresponding contents is rendered and the watermark CCI is not remarked in a case that the digital CCI of the contents is "CNM" if the watermark CCI is "None" (does not exist) or "CNM".

By the way, when the recording device (see FIG. 9) as mentioned above records the contents whose digital CCI input to the secure input is "CO", the digital CCI of the recorded contents is "CNM". Here, in this case, it is considered to support a case that the watermark CCI is "CO" and a case that the watermark CCI is "None" (watermark CCI does not exist). In this case, it is decided that the corresponding contents are rendered and the watermark CCI is remarked (is substituted to "CNM"), if the watermark CCI is "CO". In this case, both of the digital CCI and the watermark CCI become "CNM" after remark.

It is decided that the corresponding contents is rendered and the watermark CCI is not remarked if the watermark CCI is "None".

On the other hand, it is decided that the corresponding contents is not rendered if the watermark CCI is "CF" or "CN".

It is decided that the corresponding contents are rendered regardless of the content (Any) of the watermark CCI when the digital CCI of the contents is "CN". The reason is why the contents having the digital CCI of "CN" should not be recorded on the writable media.

Figures 10, 11:
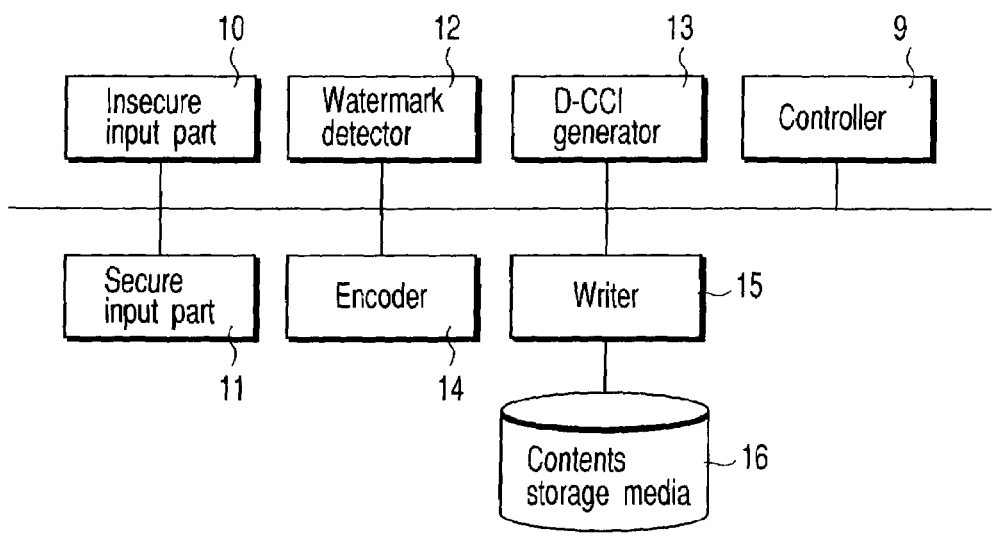
FIG. 10 is a figure which shows another example of the method of deciding whether rendering is performed and whether the remark is present or not based on the digital CCI and the watermark CCI when the media identifier is the RWM.
FIG. 11 is a figure which shows a configuration of the recording device according to the embodiment of the present invention.

FIG. 10 is a figure which shows an example of another operation table when the media identifier is RWM.

Basically, though the operation table of FIG. 10 is the same as that of FIG. 5, it is decided that the corresponding contents are rendered when the digital CCI is "CNM" and the watermark CCI is "CF" (is not remarked), in FIG. 10.

For instance, though it is decided that the watermark CCI is remarked in a case that the digital CCI is "None" and the watermark CCI is "CO" in FIG. 5 or FIG. 10, the variation of deciding not remarking is also possible in this case.

Various operation tables (judgment reference) which are explained with the above-mentioned embodiments can be executed by being properly modified.

For instance, in a case that the media identifier is RWM (see FIG. 5 and FIG. 10) and the media identifier is ROM (see FIG. 6 and FIG. 7), if the watermark CCI is "None" (do not exist) or "CF", the variation which decides that the contents are rendered (are not remarked) regardless of the contents of the digital CCI is also possible.

Well, in a case that the example of the RWM operation table in the rendering device of FIG. 5, the example of the ROM operation table in the rendering device of FIG. 6, the operation example for the insecure input in the recording device of FIG. 8, and the example of describing the operation of the secure input in the recording device of FIG. 9 are used, the several examples will be shown.

For instance, in a case that the contents data whose digital CCI is "CO" and watermark CCI is "CO" is input from the secure input and is recorded on the media (RWM) by the recording device, the digital CCI becomes "CNM" and the watermark CCI becomes "CO" according to FIG. 9, (the case that the contents data whose watermark CCI is "CO" is input from the insecure input becomes the same as the case according to FIG. 8).

Next, in a case that the contents recorded in the RWM is made to the rendering target by the rendering device (the media identifier becomes "RWM", the digital CCI becomes "CNM", and the watermark CCI is "CO"), the contents will be rendered according to FIG. 5. The watermark CCI is remarked, and, as a result, the digital CCI becomes "CNM" and the watermark CCI becomes In addition, in a case that the contents whose watermark CCI recorded in the RWM is remarked by the rendering device is made to the rendering target (the media identifier is "RWM", the digital CCI is "CNM", and the watermark CCI is "CNM"), the contents will be rendered according to FIG. 5. The remark of the watermark CCI will not be performed.

in a case that the contents data whose digital CCI is "CO"and watermark CCI is "CO" recorded on the ROM is made to the rendering target in the rendering device, the contents will be rendered according to FIG. 6. The watermark CCI is remarked, and, as a result, the digital CCI becomes "CO" and the watermark CCI becomes "CNM".

Next, in a case that the contents whose watermark CCI is remarked, recorded on the ROM (the digital CCI becomes "CO", and the watermark CCI is "CNM") is input from the secure input and is recorded on the media (RWM) by the recording device, the digital CCI becomes "CNM" and the watermark CCI becomes "CNM".

The contents data whose digital CCI is "CF" and watermark CCI is "CF" can be rendered with the rendering device and can be recorded with the recording device according to, for instance, FIG. 5 to FIG. 9.

The contents data whose digital CCI is "CN" and watermark CCI is "CN" can be rendered with the rendering device and cannot be recorded with the recording device according to, for instance, FIG. 5 to FIG. 9.

Hereinafter, the recording device according to the embodiment will be explained.

FIG. 11 is a figure which shows a configuration of the recording device according to the embodiment of the present invention.

As shown in FIG. 11, the recording device according to the embodiment has a controller 9, an insecure input part 10, a secure input part 11, a watermark detector 12 (WM detector), a digital copy control information generator 13 (D-CCI generator), an encoder 14, a writer 15, and a contents storage media 16.

The recording device according to the embodiment as mentioned above has two input parts of the secure input part 11 and the insecure input part 12.

The secure input part 11 inputs the contents data output from the secure output of other devices as mentioned above. The secure input part 11 protects the contents data according to mutual authentication of the devices and the encoding communication between devices, etc.

The insecure input part 10 inputs the contents data output from the insecure output of other devices as mentioned above. The insecure input part 10 differs from the secure input part 11, and does not protect the contents data.

The contents storage media 16 is a media to which the contents data is recorded, and is basically similar to the above-mentioned contents storage media 2. The media identifier of the contents storage media 16, the digital CCI which associated with the contents data stored in the contents storage media 16, and the watermarks CCI embedded in the contents data, are basically similar to the above-mentioned cases.

The writer 15 writes the contents data in the contents storage media 16.

In the recording device according to the embodiment, the digital CCI is associated with the contents data, and the writer 15 stores the digital CCI on the contents storage media 2 with the corresponding contents data.

The encoder 14 performs the data compression processing to the contents data recorded on the contents storage media 16.

The WM detector 12 detects the watermark from the contents data.

The D-CCI generator 13 generates the digital CCI which is associated with the contents data.

The controller 9 controls the operation of the recording device.

Figure 12A:
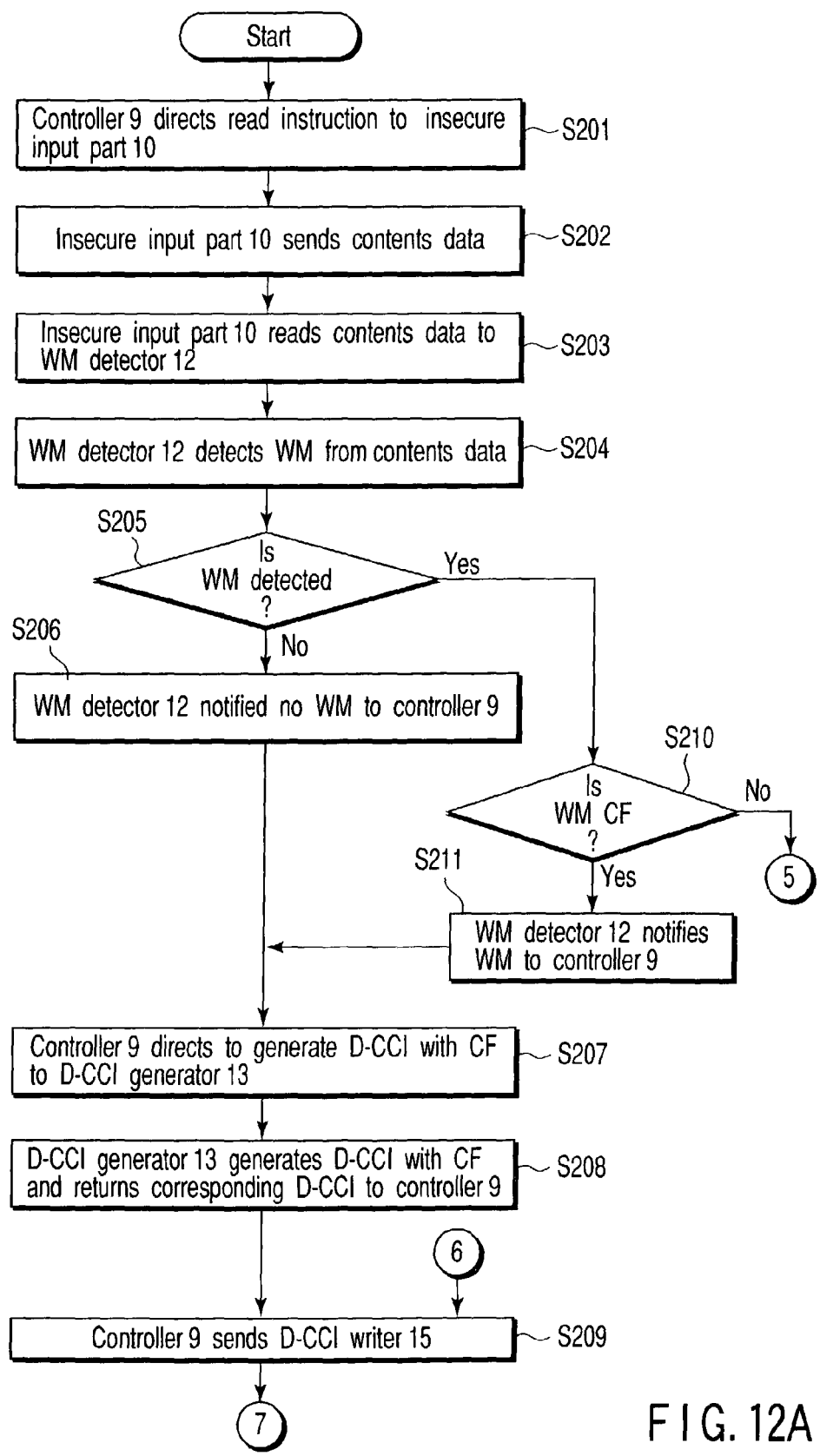
FIG. 12A to FIG. 12C are flowcharts which show an example of an operation of the recording device in the insecure input according to the embodiment of the present invention.
Figure 12B:
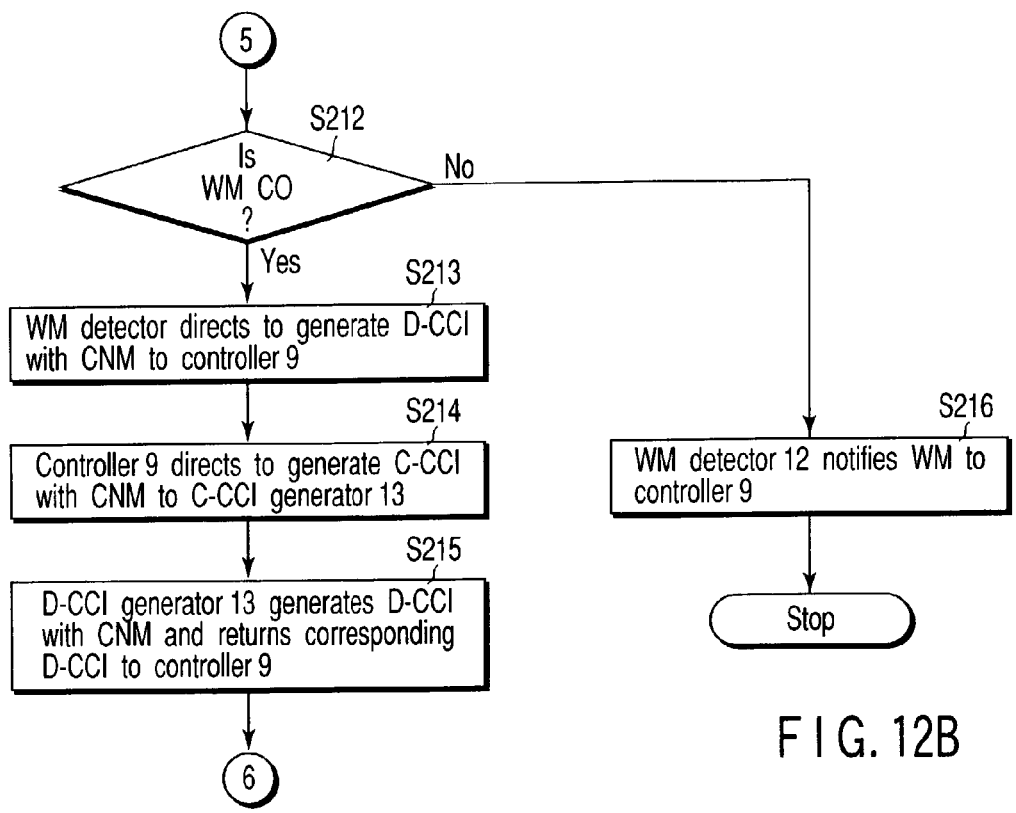
Figure 12C:
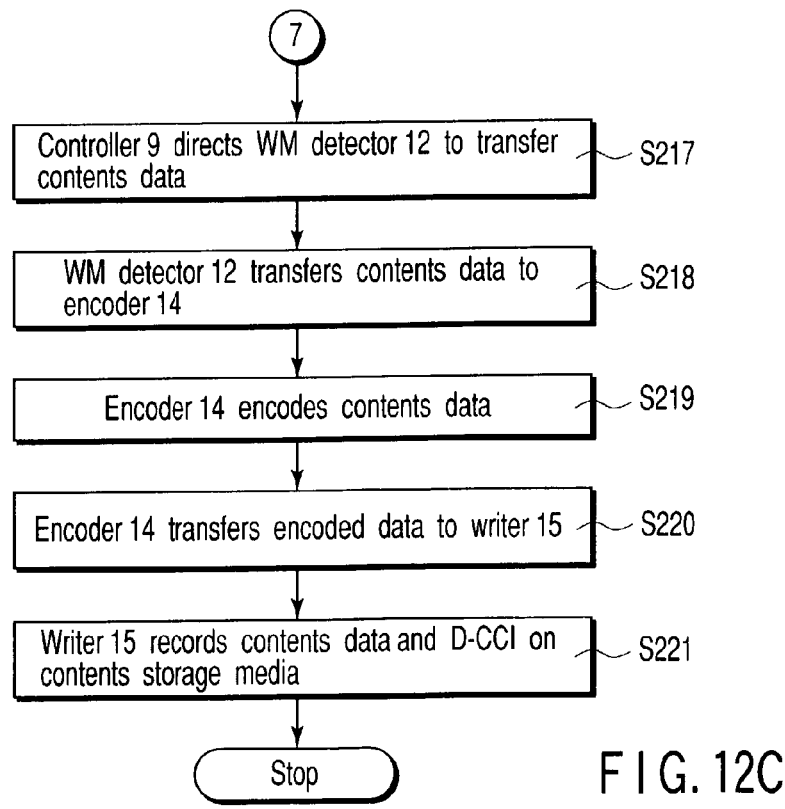

FIG. 12A to FIG. 12C are flowcharts which show an example of the operation when the contents data input to the insecure input part 10 is recorded on the recording device according to the embodiment (see FIG. 8). The contents data is data obtained as the result of the analog to digital conversion of an analog signal at a previous stage of the insecure input part 10, in many cases.

The controller 9 outputs the read instruction to the insecure input part 10 (step S201).

The insecure input part 10 which has received the read instruction reads the contents data (step S202). Then, the insecure input part 10 sends the read contents data to the WM detector 12 (step S203).

The WM detector 12 detects the watermark from the contents data received from the insecure input part 10 (step S204).

Here, the WM detector 12 notifies the controller 9 that the watermark does not exist (or, watermark having a value which shows the watermark does not exist) (step S206), if the watermark is not detected (No in step S205). The controller 9 which has received the notification directs the D-CCI generator 13 the creation of the D-CCI with "CF" (step S207). The D-CCI generator 13 which has received the instruction generates the D-CCI with "CF" and returns the corresponding D-CCI to the controller 9 (step S208).

If the watermark is detected and is "CF" (Yes in step S205 and Yes in step S210), the WM detector 12 notifies the controller 9 the watermark which is "CF" (step S211). The controller 9 which has received the notification directs the D-CCI generator 13 the creation of the D-CCI with "CF" (step S207). The D-CCI generator 13 which has received the instruction creates the D-CCI with "CF", and returns the corresponding D-CCI to the controller 9 (step S208).

If the watermark is detected and is "CO" (Yes in step S205, No in step S210 and Yes in step S212), the WM detector 12 notifies the controller 9 the watermark which is "CO" (step S213). The controller 9 which has received the notification directs the D-CCI generator 13 the creation of the D-CCI with "CNM" (step S214). The D-CCI generator 13 which has received the instruction creates the D-CCI with "CNM" and returns the corresponding D-CCI to the controller 9 (step S215).

If the watermark is detected and is "CNM" or "CN" (Yes in step S205, No in step S210 and No in step S212), the WM detector 12 notifies the controller 9 the watermark which is "CNM" or "CN" (step S216), and the processing is ended without recording the contents data.

The controller 9 sends the created corresponding D-CCI to the writer 15 in any cases in which the D-CCI is created (step S209).

The controller 9 directs the WM detector 12 so as to transfer the contents data to the encoder 14 (step S217). The WM detector 12 which has received the instruction transfers the contents data to the encoder 14 (step S211). The encoder 14 encodes the contents data received from the WM detector 12 (step S212). The encoder 14 transfers the encoded data (encoded result) to the writer 15 (step S213).

The writer 15 records the contents data and the D-CCI received from the encoder 14 on the contents storage media 16 (step S214).

Figure 13A:
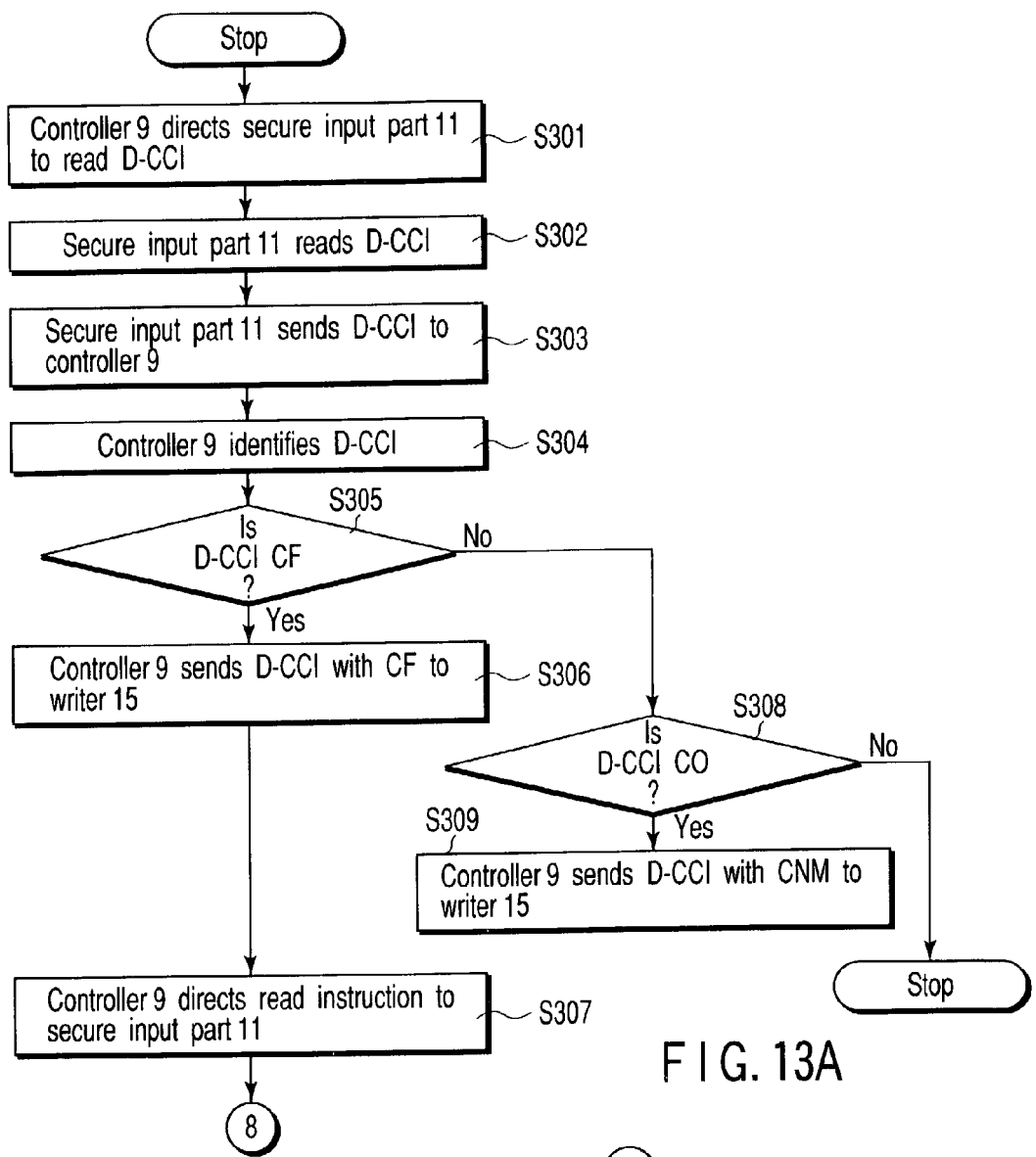
FIG. 13A and FIG. 13B are flowcharts which show an example of an operation of the recording device in the secure input according to the embodiment of the present invention.
Figure 13B:
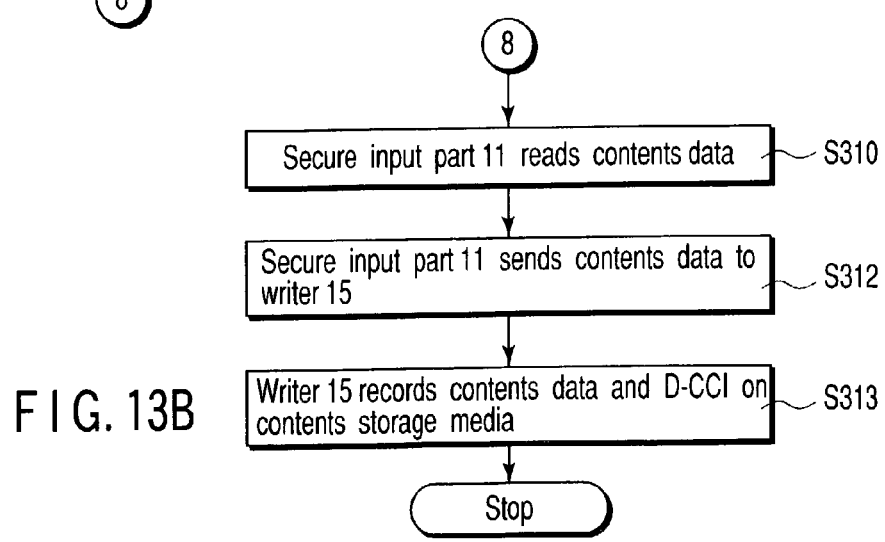

FIG. 13A and FIG. 13B show an example of the operation when the contents data input to the secure input part 11 is recorded on the recording device according to the embodiment (see FIG. 9). In this case, the contents data is originally encoded. The contents data is decoded at a previous stage of the secure input part 10, and the result thereof is input to the secure input part 10. The D-CCI which accompanies the corresponding contents is input to the secure input part 10.

The controller 9 directs the D-CCI read instruction to the secure input part 11 (step S301).

The secure input part 11 which has received the D-CCI read instruction reads the D-CCI (step S302). Then, the secure input part 11 sends the read D-CCI to the controller 9 (step S303).

The controller 9 identifies the received D-CCI (step S304).

Here, if the D-CCI is "CF" (Yes in step S305), the controller 9 sends the D-CCI which is "CF" to the writer 15 (step S306).

If the D-CCI is "CO" (Yes in step S305 and Yes in step S308), the controller 9 sends the D-CCI which is "CNM" to the writer 15 (step S306).

If the D-CCI is "CNM" or "CN" (Yes in step S305 and No in step S308), the processing is ended without recording the contents data.

In a case that the D-CCI is "CF" or "CO", the controller 9 directs the read instruction to the secure input part 11 (step S307).

The secure input part 11 which has received the read instruction reads the contents data (step S310). Then, the secure input part 11 sends the read contents data to the writer 15 (step S311). The writer 15 records the received contents data and the D-CCI on the contents storage media 16 (step S312).

The procedure of FIG. 12A to FIG. 12C, FIG. 13A and FIG. 13B are one example, and can be executed by being properly modified.

Each above-mentioned function can be achieved as software.

The embodiment can be executed as a program to make the computer execute a predetermined means (or, to function the computer as predetermined means, or to achieve a predetermined function to computer). In addition, the embodiment can be executed as a computer readable record medium on which the program is recorded.

Each following invention can be extracted from each above-mentioned embodiment. The following inventions may be solely applied and may be applied by properly combining them.

A rendering device according to a first aspect of the present invention is characterized by comprising: a reader configured to read the contents data from a media; an information acquisition unit configured to acquire a copy control information; and a controller configured to control rendering of the contents data while updating the acquired copy control information.

(1) The reader further reads a media identifier from the media, and the controller updates the copy control information based on at least the media identifier and the copy control information and controls the rendering of the contents data.

(2) The controller controls whether the contents data is rendered or not.

A rendering device to render a contents data according to a second aspect of the present invention is characterized by comprising: a reader configured to read the contents data and a first copy control information corresponding to the contents data; a detection unit configured to detect a second copy control information embedded in the contents data as a digital watermark from the contents data; and a controller configured to control whether the contents data is rendered or not based on the first copy control information and the second copy control information.

(1) A remarker configured to remark the second copy control information is further provided, and the controller further controls whether the content of the second copy control information detected from the contents data is changed or not based on the first copy control information and the second copy control information, and the remarker remarks the second copy control information embedded in the contents data as the digital watermark in a case that the controller decides to change the content of the second copy control information.

(2) The reader reads a media identifier from a media, and the controller controls whether the contents data is rendered or not based on the media identifier, the first copy control information, and the second copy control information.

(3) Each of the first copy control information and the second copy control information has one of a first information which shows that there is no limitation concerning the copy, a second information which shows that the copy is permitted only once, a third information which shows that the copy has been prohibited and the second information has been updated, and a fourth information which shows that the copy is prohibited, in a case that whether the copy is enabled or disables for the contents data according to the first copy control information or the second copy control information is controlled based on one of the first copy control information or the second copy control information, the media identifier has one of a content showing a writable media and a content showing a read only media, and the controller controls whether the contents data is rendered or not based on a combination of a content of the media identifier or no existence of the media identifier, a content of the first copy control information or no existence of the first copy control information, and a content of the second copy control information or no existence of the second copy control information.

(4) The controller decides to render the contents data only when that the second copy control information has the first information or the second information, or only when the second copy control information does not exist, in a case that the media identifier has the first information and the first copy control information does not exist.

(5) The controller decides to render the contents data only when the second copy control information has the first information or only when the second copy control information does not exist, in a case that the media identifier has the first information and the first copy control information has the first information.

(6) The controller decides to render the contents data in a case that the media identifier has the first information and the first copy control information has the third information, and in a case that the second copy control information has the second information or the third information or the second copy control information does not exist.

(7) The controller decides not to render the contents data regardless of the content of the second copy control information or no presence thereof, in a case that the media identifier has the first information and the first copy control information has the second information or the fourth information.

(8) The controller decides to render the contents data in a case that the media identifier has the second information, and the content of the first copy control information and the second copy control information are agreed.

(9) The controller decides to render the contents data in a case that the media identifier has the second information, and in a case that the first copy control information has the first information and the second copy control information does not exist.

(10) The controller decides to render the contents data in a case that the media identifier has the second information, and in a case that the first copy control information has the second information and the second copy control information does not exist.

(11) The controller decides to render the contents data in a case that the media identifier has the second information, and in a case that the first copy control information has the second information and the second copy control information does not exist.

(12) The controller decides to change the content of the second copy control information from the second information to the third information in a case that the media identifier has the first information, the first copy control information has the third information, and the second copy control information has the second information, or in a case that the media identifier has the second information, the first copy control information has the second information, and the second copy control information has the second information.

(13) The controller decides to change the content of the second copy control information from the second information to the third information in a case that the media identifier has the first information, the first copy control information does not exist, and the second copy control information has the second information.

(14) The media identifier is assumed to have the first information in a case that the media identifier does not exist.

(15) The controller decides not to render the contents data in a case that the media identifier does not exist.

A recording device to record a contents data according to a third aspect of the present invention is characterized by comprising: a secure input unit configured to input the contents data and a first copy control information corresponding to the contents data; an insecure input unit configured to input the contents data; a detector configured to detect a second copy control information embedded in the contents data as a digital watermark only for the contents data input from the insecure input unit; and a controller configured to control whether the contents data input from the secure input unit and the contents data input from the insecure input unit is recorded or not based on the first copy control information and the second copy control information, respectively.

(1) The controller decides a content of the first copy control information to be recorded based on the first copy control information as for the contents data input from the secure input unit and the second copy control information as for the contents data input from the insecure input unit.

(2) Each of the first copy control information and the second copy control information has one of a first information which shows that there is no limitation concerning the copy, a second information which shows that the copy is permitted only once, a third information which shows that the copy has been prohibited and the second information has been updated, and a fourth information which shows that the copy is prohibited, and the controller decides to record the contents data input from the secure input unit, only when the first copy control information has the first information or the second information.

(3) The controller decides to record the first copy control information having the first information in a case that the first copy control information input from the secure input unit has the first information, and decides to record the first copy control information having the third information in a case that the first copy control information input from the secure input unit has the second information, as for the contents data input from the secure input unit.

(4) The controller decides to record the contents data only when the second copy control information has the first information or the second information or only when the second copy control information does not exist, as for the contents data input from the insecure input unit.

(5) The controller decides to record the first copy control information having the first information in a case that the second copy control information has the first information or the second copy control information does not exist, and decides to record the first copy control information having the third information in a case that the second copy control information has the second information, as for the contents data input from the insecure input unit.

A copy control method in the rendering device which renders a contents data, according to a fourth aspect of the present invention is characterized by comprising: reading the contents data and a first copy control information corresponding to the contents data; detecting a second copy control information embedded in the contents data as a digital watermark from the contents data; and controlling whether to render the contents data or not based on the first copy control information and the second copy control information. With this configuration, it is preferable that whether the content of the second copy control information detected from the contents data is changed or not is controlled based on copy the first copy control information and the second copy control information in a case that the controller decides to the contents data is rendered.

A copy control method in the recording device to record a contents data, according to a fifth aspect of the present invention is characterized by comprising: inputting the contents data and a first copy control information corresponding to the contents data from a secure input; and controlling whether the input contents data is recorded or not based on the first copy control information input from the secure input regardless of a content of the second copy control information embedded in the contents data as a digital watermark. With this configuration, it is preferable that a content of the first copy control information to be recorded is decided based on the first copy control information input from the secure input regardless of a content of the second copy control information embedded in the contents data as a digital watermark, in a case that the contents data is decided to be recorded.

A computer readable recording medium according to a sixth aspect of the present invention is characterized by comprising: a contents data to which a copy control information is embedded as a digital watermark; and a copy control information which shows different meaning from meaning shown by the copy control information.

A program to function a computer as a rendering device to render a contents data, according to a seventh aspect of the present invention is characterized by comprising: a read function to read the contents data and a first copy control information corresponding to the contents data; a detection function to detect a second copy control information embedded in the contents data as a digital watermark from the contents data; and a control function to control whether the contents data is rendered or not based on the first copy control information and the second copy control information.

A program to function a computer as a recording device to record a contents data, according to an eighth aspect of the present invention is characterized by comprising: a secure input function to input the contents data and a first copy control information corresponding to the contents data; an insecure input function to input the contents data; a detection function to detect a second copy control information embedded in the contents data as a digital watermark only for the contents data input from the insecure input function; and a control function to control whether the contents data is recorded or not based on each of the first copy control information as for the contents data input from the secure input function and the second copy control information as for the contents data input from the insecure input function.

The configuration illustrated by the embodiment of the invention is an example, and other configurations are not excluded. Another configuration to obtain a part of the exemplified configuration by replacing by other one, omitting a part of the exemplified configuration, adding another function or an element to the exemplified configuration, and combining them may be possible. Another configuration which is logically equivalent to the exemplified configuration, another configuration which logically contains an equivalent part the exemplified configuration, and another configuration which are logically equivalent to the main part of the exemplified configuration, etc. are possible. Another configuration to achieve the same purpose as or similar purpose to the exemplified configuration and another configuration to achieve the same effect as or similar effect to the exemplified configuration etc. are possible.

Various variations of various configuration parts exemplified by the embodiments of the present invention can be executed by properly combining them.

The embodiment of the invention includes the invention according to various viewpoints, stages, concepts or categories of the invention such as individual devices, the invention of the two or more associated devices, the invention as the entire system, the invention of the part of the configuration of inside the individual device, or the method corresponding them etc.

Therefore, the invention can be extracted from the contents disclosed in the embodiment of the invention without being limited to the exemplified configuration.

The present invention is not limited to the above mentioned embodiments but can be executed by modifying it in a scope of the invention.

The rendering device and the recording device which enable a high-speed recording of the contents data can be provided according to the present invention.

What is claimed is:

1. A recording device to record a contents data on a computer readable storage medium comprising:
   a computer having a controller;
   a secure input unit configured to input the contents data and digital copy control information corresponding to the contents data;
   an insecure input unit configured to input the contents data;
   a detector configured to detect watermark copy control information, which is embedded in the contents data as a digital watermark; and
   a writer configured to record the contents data on the computer readable storage medium, based only on the digital copy control information, when the contents data is input from the secure input unit and record the contents data with the digital copy control information added to the contents data on the computer readable storage medium, based on the watermark copy control information, when the contents data is input from the insecure input unit, wherein
   each of the digital copy control information and the watermark copy control information has one of first information which shows that there is no limitation concerning the copy, second information which shows that the copy is permitted only once, third information which shows that the copy has been prohibited and the second information has been updated, and fourth information which shows that the copy is prohibited, and the writer records the contents data input from the secure input unit on the computer readable storage medium, only when the digital copy control information has the first information or the second information.

2. The recording device according to claim 1, wherein the writer records the digital copy control information having the first information in a case that the first copy control information input from the secure input unit has the first information, and records the digital copy control information having the third information in a case that the first copy control information input from the secure input unit has the second information, as for the contents data input from the secure input unit.

3. The recording device according to claim 1, wherein the writer records the contents data only when the watermark copy control information has the first information or the second information or only when the watermark copy control information does not exist, as for the contents data input from the insecure input unit.

4. The recording device according to claim 3, wherein the writer records the digital copy control information having the first information in a case that the watermark copy control information has the first information or the watermark copy control information does not exist, and records the digital copy control information having the third information in a case that the watermark copy control information has the second information, as for the contents data input from the insecure input unit.

5. The recording device according to claim 3, wherein the secure input unit receives data via an authenticated connection.

* * * * *